United States Patent
Kuroiwa

(10) Patent No.: US 9,575,937 B2
(45) Date of Patent: Feb. 21, 2017

(54) DOCUMENT ANALYSIS SYSTEM, DOCUMENT ANALYSIS METHOD, DOCUMENT ANALYSIS PROGRAM AND RECORDING MEDIUM

(75) Inventor: Yukiko Kuroiwa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 653 days.

(21) Appl. No.: 13/817,807

(22) PCT Filed: Jun. 16, 2011

(86) PCT No.: PCT/JP2011/064327
§ 371 (c)(1),
(2), (4) Date: Feb. 19, 2013

(87) PCT Pub. No.: WO2012/026197
PCT Pub. Date: Mar. 1, 2012

(65) Prior Publication Data
US 2013/0151957 A1    Jun. 13, 2013

(30) Foreign Application Priority Data

Aug. 24, 2010    (JP) .............................. 2010-186866

(51) Int. Cl.
| | | |
|---|---|---|
| G06F 3/00 | (2006.01) | |
| G06F 17/22 | (2006.01) | |
| G06F 17/27 | (2006.01) | |

(52) U.S. Cl.
CPC ....... *G06F 17/2211* (2013.01); *G06F 17/2223* (2013.01); *G06F 17/2755* (2013.01); *G06F 17/2795* (2013.01)

(58) Field of Classification Search
CPC ...... G06F 19/22; G06F 17/2211; G06F 17/27; G06F 17/30705; G06F 8/10; G06F 17/2229; G06F 17/30598; G06F 17/30707
See application file for complete search history.

(56) References Cited

U.S. PATENT DOCUMENTS 5,987,466 A    11/1999   Greer et al.
6,047,300 A *   4/2000   Walfish et al. ............... 715/257
(Continued)

FOREIGN PATENT DOCUMENTS

| JP | 4238616 B2 | 3/2009 |
|---|---|---|
| JP | 4255239 B2 | 4/2009 |

(Continued)

OTHER PUBLICATIONS

International Search Report in PCT/JP2011/064327 dated Sep. 13, 2011(English Translation Thereof).
(Continued)

*Primary Examiner* — Kyle Stork
(74) *Attorney, Agent, or Firm* — McGinn IP Law Group, PLLC.

(57) ABSTRACT

As a document analysis system to calculate a similarity degree between texts with high accuracy, an information processing device includes: a common character string calculation unit to extract character strings that are common between two texts and to determine whether or not the two texts are to be set as calculation objects based on a number of the extracted character strings that are common; and a similarity degree calculation unit to calculate, when the two texts are the determined calculation objects, a similarity degree therebetween by using an approximation of a Kolmogorov complexity, and when the two texts are not the calculation objects, handling the similarity degree between the two texts as being dissimilar.

18 Claims, 11 Drawing Sheets

(56) References Cited

U.S. PATENT DOCUMENTS

| | | | |
|---|---|---|---|
| 2002/0016798 A1* | 2/2002 | Sakai | G06F 17/2755 |
| | | | 715/234 |
| 2003/0187834 A1 | 10/2003 | Oda et al. | |
| 2004/0193584 A1 | 9/2004 | Ogawa et al. | |
| 2010/0242023 A1* | 9/2010 | Han et al. | 717/124 |
| 2011/0029467 A1* | 2/2011 | Spehr | G06Q 30/02 |
| | | | 706/13 |
| 2012/0095837 A1 | 4/2012 | Bharat et al. | |
| 2012/0124048 A1 | 5/2012 | Kuroiwa | |
| 2013/0138428 A1* | 5/2013 | Chandramouli et al. | 704/9 |

FOREIGN PATENT DOCUMENTS

| | | |
|---|---|---|
| JP | 2009-199601 A | 9/2009 |
| WO | WO2010/117031 A1 | 10/2010 |

OTHER PUBLICATIONS

Ming Li, et al., 2004. "The Similarity Metric", IEEE Transaction on Information Theory, vol. 50, No. 12, pp. 3250-3264.

Yukiko Fujiwara et al,, "Product/Service Value Validation based on Kolmogorov Complexity", FIT2009 Dai 8 Kai Forum on Information Technology Koen Ronbunshu, Aug. 20, 2009 (Aug. 20, 2009), vol. 2, pp. 55 to 62.

Yukiko Fujiwara et al., "Requirements Extraction based on Kolmogorov Complexity",Dai 72 Kai (Heisei 22 Nen) Proceedings of the National Meeting of Information Processing Society of Japan, Mar. 8, 2010 (Mar. 8, 2010),vol. I, pp. 1-333 to 1-334.

R. Cilibrasi and P.M.B. Vitanyi,"Clustering by Compression", IEEE Trans. on Information Theory, IEEE, Apr. 2005, vol. 51, No. 4, pp. 1523-1545.

* cited by examiner

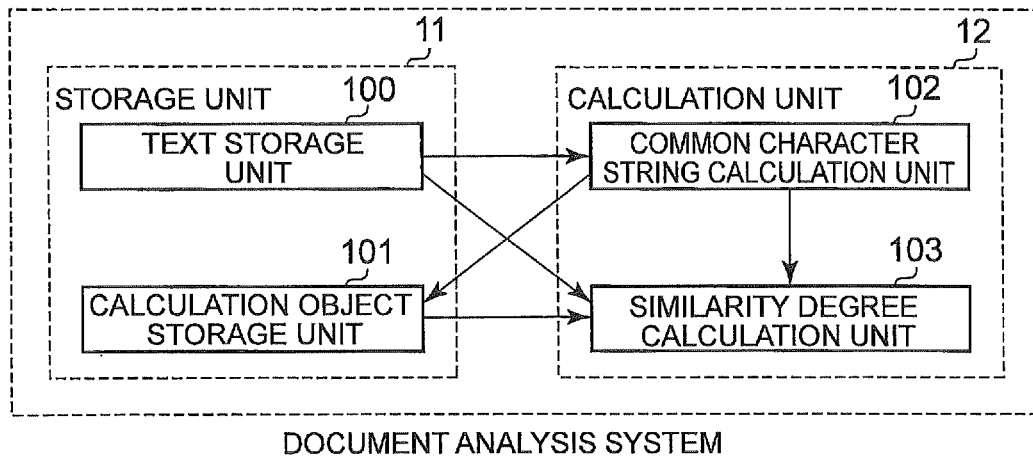

DOCUMENT ANALYSIS SYSTEM

FIG. 1

| ID | TEXT |
|---|---|
| 0 | 認証システムは、1台でシングル構成とする。<br>(NINSHOUSHISUTEMU WA,<br> ICHIDAI DE SHINGURUKOSEI TO SURU.) |
| 1 | 認証システムは、登録者かどうかの認証を行う。<br>(NINSHOUSHISUTEMU WA, TOUROKUSHA KA<br> DOUKA NO NINSHOU WO OKONAU.) |
| 2 | 計算システムは、2台で負荷分散構成とする。<br>(KEISANSHISUTEMU WA, NIDAI DE<br> FUKABUNSANKOUSEI TO SURU.) |
| 3 | 運用管理は、別途調達する。<br>(UNYOKANRI WA, BETTO CHOUTATSUSURU.) |
| 4 | 認証システムは、シングル構成である。<br>(NINSHOUSHISUTEMU WA,<br> SHINGURUKOSEI DE ARU.) |
| 5 | 計算システムは、負荷分散構成とする。<br>(KEISANSHISUTEMU WA,<br> FUKABUNSANKOSEI TO SURU.) |

FIG. 2

| ID | CALCULATION OBJECT |
|---|---|
| 0 | 0,1,2,3,4,5 |
| 1 | 0,1,2,4,5 |
| 2 | 0,1,2,3,4,5 |
| 3 | 0,2,3,5 |
| 4 | 0,1,2,4,5 |
| 5 | 0,1,2,3,4,5 |

FIG. 3

| ID | CALCULATION OBJECT |
|---|---|
| 0 | 0,4 |
| 1 | 1,4 |
| 2 | 2,5 |
| 3 | 3 |
| 4 | 0,1,4 |
| 5 | 2,5 |

| ID | NUMBER OF CATEGORY ELEMENT |
|---|---|
| 0 | 0 |
| 1 | 1 |
| 2 | 2 |
| 3 | 3 |
| 4 | 4 |
| 5 | 5 |

FIG. 12

| ID | NUMBER OF CATEGORY ELEMENT |
|---|---|
| 0 | 0,4 |
| 1 | 1 |
| 2 | 2 |
| 3 | 3 |
| 5 | 5 |

FIG. 13

| ID | TEXT |
|---|---|
| 0 | 認証システムは、1台でシングル構成とする。<br>認証システムは、シングル構成である。<br>(NINSHOUSHISUTEMU WA, ICHIDAI DE SHINGURUKOSEI TO SURU.<br>NINSHOUSHISUTEMU WA, SHINGURUKOSEI DE ARU.) |
| 1 | 認証システムは、登録者かどうかの認証を行う。<br>(NINSHOUSHISUTEMU WA, TOUROKUSHA KA DOUKA NO NINSHOU WO OKONAU.) |
| 2 | 計算システムは、2台で負荷分散構成とする。<br>(KEISANSHISUTEMU WA, NIDAI DE FUKABUNSANKOSEI TO SURU.) |
| 3 | 運用管理は、別途調達する。<br>(UNYOKANRI WA, BETTO CHOUTATSUSURU.) |
| 5 | 計算システムは、負荷分散構成とする。<br>(KEISANSHISUTEMU WA, FUKABUNSANKOSEI TO SURU.) |

FIG. 14

|   | 0   | 1   | 2   | 3   | 4   | 5   |
|---|-----|-----|-----|-----|-----|-----|
| 0 | 1.0 | 0.0 | 0.0 | 0.0 | 0.7 | 0.0 |
| 1 | 0.0 | 1.0 | 0.0 | 0.0 | 0.5 | 0.0 |
| 2 | 0.0 | 0.0 | 1.0 | 0.0 | 0.0 | 0.5 |
| 3 | 0.0 | 0.0 | 0.0 | 1.0 | 0.0 | 0.0 |
| 4 | 0.7 | 0.5 | 0.0 | 0.0 | 1.0 | 0.0 |
| 5 | 0.0 | 0.0 | 0.5 | 0.0 | 0.0 | 1.0 |

FIG. 15

|   | 0   | 1   | 2   | 3   | 5   |
|---|-----|-----|-----|-----|-----|
| 0 | 1.0 | 0.4 | 0.0 | 0.0 | 0.0 |
| 1 | 0.4 | 1.0 | 0.0 | 0.0 | 0.0 |
| 2 | 0.0 | 0.0 | 1.0 | 0.0 | 0.5 |
| 3 | 0.0 | 0.0 | 0.0 | 1.0 | 0.0 |
| 5 | 0.0 | 0.0 | 0.5 | 0.0 | 1.0 |

FIG. 16

DOCUMENT ANALYSIS SYSTEM, DOCUMENT ANALYSIS METHOD, DOCUMENT ANALYSIS PROGRAM AND RECORDING MEDIUM

TECHNICAL FIELD

This invention relates to a similarity degree calculation between texts which is performed in a text analysis. More particularly, this invention relates to a similarity degree calculation between requests which can be used to extract requests without overlaps, omission, or dropouts from documents and the like in which requests are described.

BACKGROUND ART

For example, omissions and dropouts of requests which occur in system development lead to an increase in cost of modification due to a procedure turned back from a later step. Therefore, the importance of early detection of omissions and dropouts is widely known. In recent years, to detect the omissions and dropouts of requests, a human visually inspects whether or not there is a problem in documents in which requests are described while viewing inspection items that are prepared in advance. Further, in a case where there are a reflection source document and a reflection destination document such as a request for proposal (REP) and a proposal corresponding thereto or a specification and the proposal corresponding thereto, a person also visually inspects whether or not parts corresponding to individual matters described in the reflection source document exist in the reflection destination document.

However, the inspection of a large volume of documents including overlapping descriptions raises a problem of requiring much cost (personnel expenses, time, and the like). Further, there is also a problem in that the omissions, dropouts, and the like may be overlooked in manual work. Also in general documents, manual verification work is conducted for inconsistent points and ambiguous points of the document, the omissions and dropouts of the matters of a source document from another document created based on the original document, and the like. This also requires much cost and leaves the problem in that overlooking may occur in the manual work.

CITATION LIST

Patent Literature

Patent Literature 1: Japanese Patent No. 4255239
Patent Literature 2: Japanese Unexamined Patent Application Publication (JP-A) No. 2009-199601
Patent Literature 3: Japanese Patent No. 4238616

Non Patent Literature

Non Patent Literature 1: Ming Li, et al., 2004. "The Similarity Metric", IEEE Transaction on Information Theory, Vol. 50, No. 12, pp. 3250-3264

SUMMARY OF THE INVENTION

Problem to be Solved by the Invention

In contrast thereto, a calculation method for a similarity degree based on an occurrence frequency of a word(s) is generally used as a method of automatically analyzing texts by using an information processing device. In this general text analysis method, words can be extracted from texts by a morphological analysis, and the similarity degree between the texts can be calculated based on the occurrence frequency of the word(s). The morphological analysis can be performed by using, for example, MeCab or ChaSen being a morphological analysis engine. The morphological analysis refers to, for example, selecting an output sequence of morphemes "東京" (Tokyo), "都" (to), "に" (ni), and "いる" (iru) with regard to an input sentence "東京都にいる" (Tokyo-to ni iru) in Japanese. Here, another example of the output sequence is "東" (higashi), "京都" (Kyoto), "に" (ni), and "いる" (iru).

In English, respective words are normally segmented by blanks, and hence blanks can be used as delimiters between morphemes. However, in the morphological analysis, "microwave" and "micro wave", even if having the same meaning, are assumed as different morphemes in splitting. Further, in the morphological analysis, compounds indicating different meanings are sometimes assumed as the same morpheme in the splitting. Further, in "can't" and "can not", in particular, "t" and "not" cannot be calculated as being similar. Further, English has a problem of inflection at the end of a word. For example, in "booking a flight" and "the flight was booked.", "booking" and "booked" have the same meaning, but are determined as being different words as they are. Therefore, the analysis needs to be performed after trimming the end of the word. Further, American English and British English have different spellings of words, and hence such words cannot be assumed to indicate the same meaning as they are. For example, in a case where an American English word "color" and a British English word "colour" coexist, "color" and "colour" cannot be calculated as being the words that indicate the same meaning without, for example, having been registered in a dictionary in advance.

In the morphological analysis, a large volume of general documents are prepared, and scores are determined in advance from those documents, the scores indicating probabilities of occurrence of the morphemes such as nouns and verbs within the respective documents and probabilities of concatenation therebetween. Then, the morphological analysis engine selects the splitting that exhibits the highest score with regard to a given input sentence. In the example of the above-mentioned Japanese, the large volume of general documents include more cases where "東京" (Tokyo) is concatenated with "都" (to) than cases where "東" (higashi) is concatenated with "京都" (Kyoto). Therefore, in processing performed by the morphological analysis engine, the score indicating the probability of concatenation between "東京" (Tokyo) and "都" (to) is higher than the score indicating the probability of concatenation between "東" (higashi) and "京都" (Kyoto), and hence the input sentence "東京都にいる" (Tokyo-to ni iru) is split into the respective morphemes "東京" (Tokyo), "都" (to), "に" (ni), and "いる" (iru). Then, the morphological analysis engine calculates the similarity degree with respect to the occurrence frequency of each of the morphemes obtained in the splitting. Further, text analysis processing is also disclosed in Patent Literature 1 and Patent Literature 2. Patent Literature 1 discloses a method of extracting information on documents whose contents are similar to each other from a document database based on the occurrence frequency of the words. Patent Literature 2 discloses a method of supplying an advertisement by using user information based on a feature vector of a word.

However, the text analysis method using the morphological analysis raises a problem in that incorrect splitting into words (morpheme splitting) may cause sentences similar to each other to be calculated as being dissimilar to each other. For example, a text "外国人参政権" (gaikokujin-sanseiken) expressed in kanji is often split into "外国" (gaikoku), "人参" (jinsan), and "政権" (seiken) by the morphological analysis, and in such a case, the text cannot be calculated as being similar to a text relating to foreigners' rights to vote. When put into English, the text originally meaning ""franchise: 参政権" (sanseiken) of "foreigner: 外国人" (gaikokujin)" is split into three morphemes meaning "foreign country", "carrot", and "the government", which makes no sense, to thereby cause a problem in a similarity degree calculation.

Such a phenomenon is conspicuously observed as a tendency to induce unintentional splitting different from a desired splitting in a case where the morphological analysis is performed on sentences in which special terms are described. In particular, documents in which requests are described include industry/field-specific task terms, and a large volume of documents cannot be prepared for such a task word as to be used in a special scene, which raises a problem in that the splitting is likely to be incorrectly performed. Further, in the text analysis method using the morphological analysis, even similar Japanese words "高速" (kosoku) and "迅速" (jinsoku) or similar English words "speed" and "speedy" are not assumed as the same words, and hence synonyms need to be converted in order to be assumed to be the same. However, the documents in which requests are described include the industry/field-specific task terms, and hence a dictionary indicating the synonyms cannot be fully equipped therefor in advance, which also raises a problem in that the similarity degree cannot be calculated correctly. This problem is also caused by the fact that a scope of determining that meanings are the same differs between industries or between fields.

Further, there is known a method of subjecting a text analysis based on words to an approximation by a Kolmogorov complexity that enables similar words to be analyzed to be similar. For example, Non Patent Literature 1 discloses a similarity degree calculation method based on the Kolmogorov complexity. With the Kolmogorov complexity, distances are approximated by converting a natural language into a binary symbol string and then compressing.

However, the approximation of the Kolmogorov complexity poses a problem in that performance in classifying the similarity degree is low because different words are converted into similar binary symbol strings. For example, in a case where "あ" (a) is converted into "1010010010100010" and "い" (i) is converted into "1010010010100100" in Japanese, the first-13th characters are the same although "あ" (a) and "い" (i) are completely different words in an original natural language. The same holds true of "a" and "b" in English. Therefore, in the determination performed by the information processing device, "あ" (a) and "い" (i) or "a" and "b" are calculated as being similar to some extent. As described above, the approximation of the Kolmogorov complexity poses a problem in that the similarity degree is sometimes calculated as being high even if the same character is not included in the original texts.

Further, it cannot be said that two texts are similar to each other even if the same character strings are included in the two original texts but if those same character strings are only hiragana or other such character strings that are included in a large number of texts. Against this problem, in Patent Literature 3, by extracting only feature words being character strings having independent meanings from documents, the similarity degree is calculated after simply excluding "a", "the", "in", and other such less significant character strings that appear in a large number of texts. However, if the characters are simply excluded as described above, in the case of Japanese whose respective words cannot be segmented, there is a problem in that, for example, a text "東でなく京都は西日本なので" (higashi de naku Kyoto wa nishi-Nippon nanode) becomes "東京都西日本" (higashi Kyoto nishi-Nippon), which may cause the similarity degree to a text relating to "東京都" (Tokyo-to) to become higher than required.

In addition, texts being a determination object may be searched with high accuracy by categorizing (clustering) the texts into some groups (clusters). However, there is a problem in that, for example, depending on the calculation method for the similarity degree between the clusters including a plurality of texts, the numbers of texts included in the clusters may be biased or may be likely to be the same.

This invention provides a document analysis system for calculating a similarity degree between texts with high accuracy.

Means to Solve the Problem

A document analysis system according to this invention includes: a common character string calculation unit to extract character strings that are common between two texts and to determine whether or not the two texts are to be set as calculation objects based on a number of the extracted character strings that are common; and a similarity degree calculation unit to calculate, when the two texts are the calculation objects determined by the common character string calculation unit, a similarity degree therebetween by using an approximation of a Kolmogorov complexity, and when the two texts are not the calculation objects, handling the similarity degree between the two texts as being dissimilar.

Effect of the Invention

According to this invention, not only a converted binary symbol string but also information on a common character string in an original natural language is used when the similarity degree between the texts is calculated by using the approximation of the Kolmogorov complexity, and hence it is possible to provide the document analysis system capable of calculating the similarity degree with high accuracy.

BRIEF DESCRIPTION OF THE DRAWING

FIG. 1 is a block diagram illustrating a configuration example of a document analysis system according to a first embodiment.

FIG. 2 is an explanatory diagram illustrating an example of texts stored in a text storage unit 100.

FIG. 3 is an explanatory diagram illustrating an example of a calculation object stored in a calculation object storage unit 101.

FIG. 12 is an explanatory diagram illustrating an example of a category number storage unit 300.

FIG. 13 is an explanatory diagram illustrating another example of the category number storage unit 300.

FIG. 14 is an explanatory diagram illustrating an example of a category result storage unit 301.

FIG. 15 is an explanatory diagram illustrating an example of a similarity degree storage unit 302.

FIG. 16 is an explanatory diagram illustrating another example of the similarity degree storage unit 302.

MODE FOR EMBODYING THE INVENTION

Figure 4:
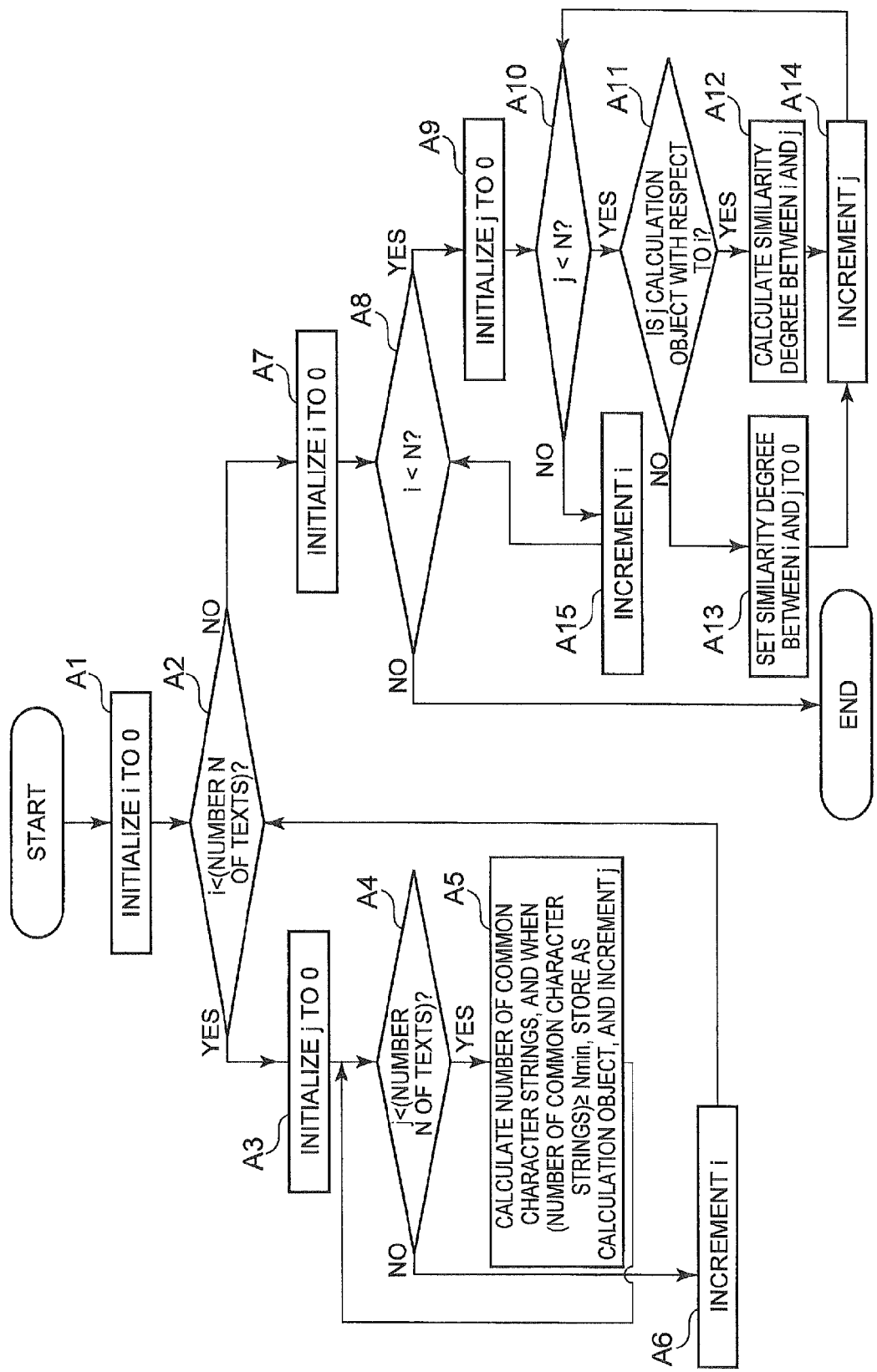
FIG. 4 is a flowchart illustrating an example of progress of processing performs by the document analysis system according to the first embodiment.

A document analysis system according to an embodiment mode of this invention employs a mode of including a common character string calculation unit and a similarity degree calculation unit. Note that, the document analysis system may be provided with, as needed, a storage unit for storing sentences and the like to be determination objects and recording a threshold value and various tables. The common character string calculation unit extracts character strings that are common between two texts and determines whether or not the two texts are to be set as calculation objects based on a number of the extracted character strings that are common. The similarity degree calculation unit calculates, when the two texts between which a similarity degree is to be determined are the calculation objects, the similarity degree between the two texts by using an approximation of a Kolmogorov complexity, and when the two texts are not the calculation objects, handles the similarity degree between the two texts as being dissimilar (sets the similarity degree to zero).

That is, with regard to the two texts between which the similarity degree is to be determined, an information processing device operating as the document analysis system acquires both the texts as natural languages, then extracts common character strings that exist in common, and determines based on the existing number of common character strings whether or not to perform calculation processing for the similarity degree. After that, when the existing number is equal to or larger than a predetermined threshold value, a procedure advances to the calculation processing, and the similarity degree between the texts are calculated by using the approximation of the Kolmogorov complexity.

In the determination as to whether or not to perform calculation processing for the similarity degree performed by the common character string calculation unit, to example, the common character string calculation unit may determine the two texts as the calculation objects when a predetermined number of common character strings or more having a predetermined character string length exist in the two texts, and otherwise may determine that the two texts are not to be set as the calculation objects.

Further, the common character string calculation unit may extract only the common character string that does not include a predetermined exception character.

Further, the common character string calculation unit may convert a predetermined exception character into a special character, then scan the two texts in order, and extract only the common character string that does not include the special character.

Further, assuming that, with regard to a plurality of texts, respective sets each including one text are set as respective clusters, the similarity degree calculation unit may include: a control unit to calculate the similarity degree between the texts included in the clusters as the similarity degree between the clusters and performing control so that subsequent processing is repeated until a predetermined termination condition is satisfied; a selection unit to select two clusters based on the similarity degree between the clusters; a merge unit to merge the selected two clusters; and a similarity degree updating unit to determine, with regard to the two clusters, whether or not the two clusters are to be set as the calculation objects based on the common character strings between the respective texts included in the clusters, and when the two clusters are to be set as the calculation object, calculating the similarity degree between the text obtained by arranging the texts included in one cluster in order and the text obtained by arranging the texts included in another cluster in order by using the approximation of the Kolmogorov complexity and setting the similarity degree between the texts as the similarity degree between the two clusters, and when the two clusters are not to be set as the calculation object, setting the similarity degree between the two clusters to zero.

In this manner, a less significant character string (exception character) such as "hiragana" is converted into a special symbol, it is determined whether or not to effect the calculation object based on a common partial string that does not include the special symbol, the similarity degree is calculated by including the less significant character string for the calculation object, and hence the similarity degree can be calculated with high accuracy by using a less significant part as well. In addition, both individual information on the texts included in clusters and information on the whole clusters are used in categorization and search, and hence the similarity degree can be calculated with high accuracy. Note that, in Japanese sentences, with regard to "hiragana" in a case where "kanji" and "hiragana" are used in mixture, the character string displayed in "hiragana" is often the less significant character string than the character string expressed in "kanji" in many cases.

First Embodiment

Next, a detailed description is made of a document analysis system according to a first embodiment of this invention with reference to the accompanying drawings. The document analysis system according to the first embodiment calculates the similarity degree between the texts. The text represents a sentence, a paragraph, and a chapter within a document, one row of a table, and the like. In the following, as an example, a description is made of a case where requests and specifications that are extracted from a request for proposal, a proposal, a specification, and the like are used as the texts. The request for proposal (RFP) is a document used for requesting proposals from an IT vendor to be a contractor when a public agency or a corporation to be an orderer procures an information system, an IT service, or the like. The request for proposal is also to referred to as a request for procurement, a request for tender, a petition for proposal, a written request for proposal, a written petition for proposal, a call for proposals, a request for quotation, a request for submission of proposals, a tender documentation, consignment specifications, and the like. Described in the request for proposal are specific request matters including, for example, a summary, a purpose, a necessary function, a service level, and contract terms. The proposal is a document in which the IT vendor describes specific proposal matters. The proposal is referred to also as a project book, a project proposal, and the like. Described in the proposal are the specific proposal matters including, for example, a purpose or an aim, means for achieving a function and a service level, and a development system. The specification is a document in which requirement matters being matters to be satisfied by a system or a service are described. The specification is referred to also as a requirement specification, a request definition, a requirement definition, a functional specification, a design documentation, and a contract. The requirement matters agreed upon between the orderer and the contractor are organized and described in the specification.

Referring to FIG. 1, the document analysis system according to this embodiment includes a storage unit 11 for storing information and a calculation unit 12 operating under program control.

The storage unit 11 includes a text storage unit 100 and a calculation object storage unit 101.

The text storage unit 100 stores a set of texts extracted from the input document. The extraction and recording of the texts may involve separately-provided means for performing extraction or the like or may be performed by the calculation unit 12. FIG. 2 is an explanatory diagram illustrating an example of texts stored in the text storage unit 100. FIG. 2 illustrates an example in which one text is formed of one sentence, but each text may be formed of one paragraph or one chapter. Assuming hiragana, katakana, kanji, symbols, and the like as a set A of characters, the text is expressed as a character string in which zero or more characters included in the set A are continuous. To simplify the description, a text having an ID of "i" is hereinafter referred to as "text i" or simply as "i".

The calculation object storage unit 101 stores a matching degree of characters as a natural language determined by the calculation unit 12. Based on the matching degree, the document analysis system uses the approximation of the Kolmogorov complexity to screen objects based on whether or not to be subjected to a calculation process for the similarity degree. FIG. 3 is an explanatory diagram illustrating an example of the calculation object stored in the calculation object storage unit 101. With reference to a predetermined character string length m and a lower limit Nmin of the number of common character strings, when the number of common partial strings having the character string length m existing between the text i and a text j is Nmin or larger, the calculation object storage unit 101 stores j (of text) as the calculation object (of text) having an ID of i. When the number is smaller than Nmin, the calculation object storage unit 101 does not store j as the calculation object having an ID of i. The character string length m and the lower limit Nmin of the number of common character strings may be designated by being input by a user of the system through a keyboard and the like, may be stored in the system as a default, or may be designated in another manner. FIG. 3 illustrates results obtained in a case where m=2 and Nmin=3 are given to text examples illustrated in FIG. 2. Between a text 0 and a text 1, the number of common partial strings is three or larger because character strings "認証" (ninshou), "証シ" (shoshi), and "シス" (shisu) are common, and hence 1 is stored as the calculation object corresponding to the ID of 0. On the other hand, between the text 1 and a text 3, only a character string "は、" (wa,) is common, and hence the text having an ID of 3 is not stored as the calculation object of the text having an ID of 1. Note that, the calculation object can be set as a symmetric matrix, and hence any one of diagonal components may be described to thereby reduce necessary memory in half.

The calculation unit 12 includes a common character string calculation unit 102 and a similarity degree calculation unit 103.

The common character string calculation unit 102 calculates information on common character strings having a predetermined number of character strings with regard to two texts (texts to be determination objects) among the texts stored in the text storage unit 100.

The similarity degree calculation unit 103 calculates the similarity degree between the texts by using the approximation of the Kolmogorov complexity based on the information on the calculation object stored in the calculation object storage unit 101.

Next, a detailed description is made of an overall operation according to the first embodiment with reference to a flowchart of FIG. 4.

The common character string calculation unit 102 first initializes i indicating a number of a first text to 0 (Step A1).

The common character string calculation unit 102 then compares i with a number N of texts (Step A2). When i is smaller than N (i<N), the procedure advances to Step A3. When i is equal to or larger than N (i≥N), the procedure advances to Step A7.

The common character string calculation unit 102 initializes j indicating the number of a second text to 0 (Step A3).

The common character string calculation unit 102 then compares j with the number N of texts (Step A4). When j is smaller than N (j<N), the procedure advances to Step A5. When j is equal to or larger than N (j≥N), the procedure advances to Step A6.

The common character string calculation unit 102 calculates the number of common character strings between i and j, and when the number is equal to or larger than Nmin, stores j in the calculation object storage unit 101 as the calculation object, and increments j (Step A5). The incrementing represents adding one to j. An example of this processing of Step A5 is described later in detail with reference to a flowchart of determination of the number of common character strings.

The common character string calculation unit 102 determines that j has become equal to or larger than N (j≥N), and increments i (Step A6). Then, the procedure returns to Step A2.

Subsequently, i becomes equal to or larger than N (i≥N), and the similarity degree calculation unit 103 again initializes i indicating the number of the first text to 0 (Step A7).

The similarity degree calculation unit 103 then compares i with the number N of texts (Step A8). When i is smaller than N (i<N), the procedure advances to Step A9. When i is equal to or larger than N (i≥N), the processing is brought to an end. The similarity degree obtained as a result of the calculation may be output immediately through a display device, a printing apparatus, or the like, may be stored and later output in response to a request or the like received from the user of the system, or may be output in another manner.

The similarity degree calculation unit 103 then initializes j indicating the number of the second text to 0 (Step A9).

The similarity degree calculation unit 103 then compares j with the number N of texts (Step A10). When j is smaller than N (j<N), the procedure advances to Step A11. When j is equal to or larger than N (j≥N), the procedure advances to Step A15.

The similarity degree calculation unit 103 then refers to the calculation object storage unit 101 to determine whether or not j is the calculation object for the similarity degree with respect to i (Step A11). When j is the calculation object, the procedure advances to Step A12. When j is not included in the calculation object, the procedure advances to Step A13.

When j is the calculation object with respect to i, the similarity degree calculation unit 103 performs the calculation processing for the similarity degree between i and j (Step A12). A calculation method for the similarity degree may be designated by being input by the user of the system through the keyboard and the like, may be stored in the system as a default, or may be designated in another manner. For example, the similarity degree can be calculated by using the approximation of the Kolmogorov complexity. For example, if an algorithm for compressing objects is defined in advance, a similarity degree s(i,j) between the object i and the object j can be calculated by a numerical expression indicated by, for example, $d(i,j)=1-C(ij)/\{C(i)+C(j)\}$ or $d(i,j)=1-[C(ij)-min\{C(i),C(j)\}]/max\{C(i),C(j)\}$, where $C(i)$ represents a size in a case where the object i is compressed, $C(j)$ represents a size in a case where the object j is compressed, and $C(ij)$ represents a size in a case where a new object into which the objects i and j are concatenated is compressed. A compression algorithm to be designated is, for example, zip or gzip. With the compression algorithm, encoding may be performed for the character string in pair with the symbol being a character or a preceding partial character string (matching length, matching position). In the encoding, for example, the number of symbols that appear in the character string is obtained, and a shorter code is assigned to a larger number of symbols. Therefore, when the approximation of the Kolmogorov complexity is used, if a Japanese text is set as an object, sentences "高速に動作" (kousokuni dosa) and "迅速に動作" (jinsokuni dosa) involve a short code assigned to "速に動作" (sokuni dosa) and can be calculated as having a high similarity degree.

In this case, when the numbers of i and j match each other, the similarity degree may be set to 1 without calculation. The calculated similarity degree may be output immediately through the display device, the printing apparatus, or the like, may be stored and later output in response to the request or the like received from the user of the system, or may be output in another manner.

When j is not included in the calculation object with respect to i, the similarity degree calculation unit 103 sets the similarity degree between i and j to 0 (Step A13). The calculated similarity degree may be output immediately through the display device, the printing apparatus, or the like, may be stored and later output in response to the request or the like received from the user of the system, or may be output in another manner.

After determining a value of the similarity degree of j with respect to i, the similarity degree calculation unit 103 increments j, and returns to Step A10 (Step A14).

After repeating a loop to determine the values of the similarity degrees of all the texts with respect to the text assigned to i (j≥N), the similarity degree calculation unit 103 increments i, and advances to Step A8 (Step A15).

Figure 5:
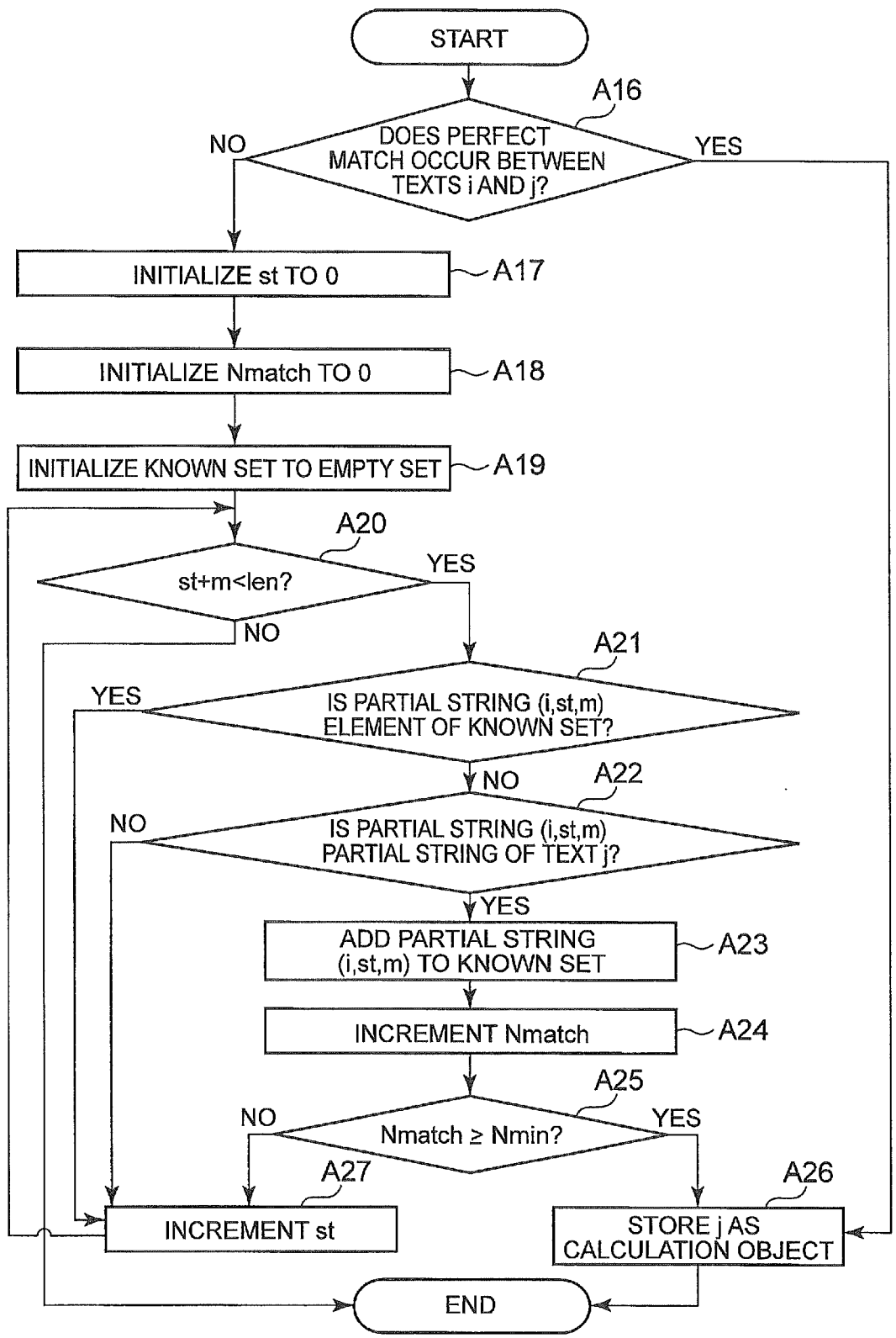
FIG. 5 is a flowchart illustrating an example of progress of processing for determining a number of common character strings which is performed by the document analysis system according to the first embodiment.

Next, a detailed description is made of an operation of determination of the number of common character strings according to the first embodiment with reference to a flowchart of FIG. 5.

The common character string calculation unit 102 first examines whether or not a perfect match occurs between the text i and the text j (Step A16). When the match occurs, the procedure advances to Step A26, and when the match does not occur, the procedure advances to Step A17. Note that, this step is performed in order to effect the calculation object when a short text such as "了解" (ryokai) perfectly matches, but may be omitted. The Japanese word "了解" (ryokai) means "OK" in English.

The common character string calculation unit 102 initializes a number st indicating a start position of the character string to 0 (Step A17).

The common character string calculation unit 102 then initializes a number Nmatch indicating the number of common character strings between the text i and the text j to 0 (Step A18).

The common character string calculation unit 102 then initializes a number of elements included in a known set to an empty set of zero elements (Step A19). The known set represents a set of common character strings that have already been found between the text i and the text j.

The common character string calculation unit 102 then compares a value (st+m) obtained by adding the character string length m to the number st of the start position of the character string with the number len of character strings of the text i (Step A20). When st+m is smaller than len (st+m<len), the procedure advances to Step A21. When st+m is equal to or larger than len (st+m≥len), the calculation of the number of common character strings between i and j is finished.

The common character string calculation unit 102 examines whether or not a partial string (i,st,m) is an element of the known set (Step A21). When the partial string (i,st,m) is the element, the procedure advances to Step A27. When the partial string (i,st,m) is not the element, the procedure advances to Step A22.

Figure 6:
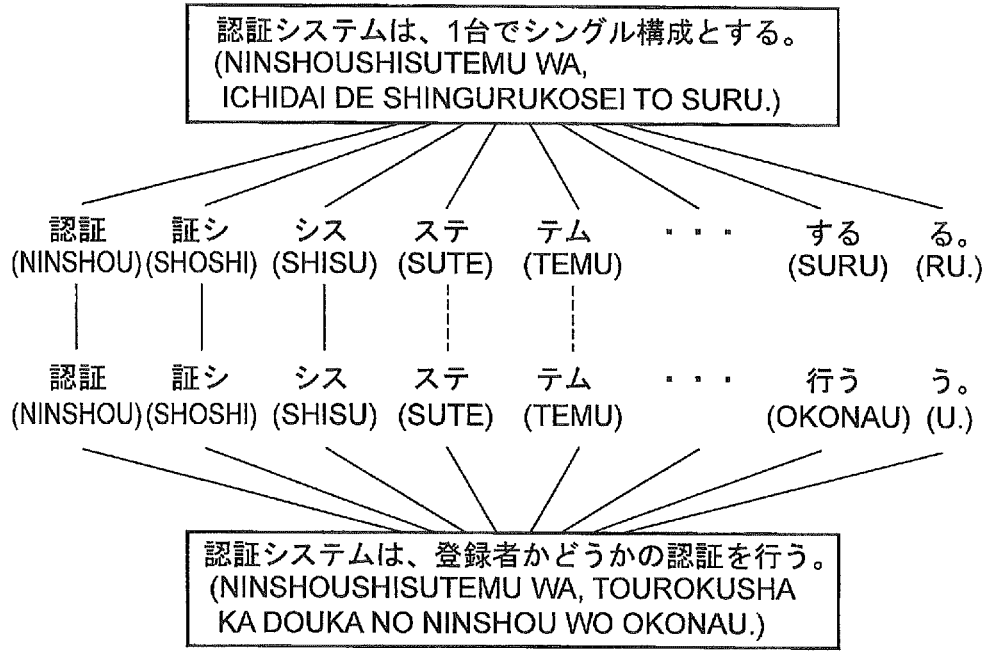
FIG. 6 is an explanatory diagram illustrating an example of examining whether or not a partial string is included in a text j.

It is examined whether or not the partial string having m characters starting in a position st of the text i is included as the partial string of the text j (Step A22). When the partial string is included, the procedure advances to Step A23, and when the partial string is not included, the procedure advances to Step A27. FIG. 6 is an explanatory diagram illustrating an example of examining whether or not the partial string is included in the text j. In FIG. 6, in the comparison between the text 0 and the text 1 illustrated in FIG. 2, in a case where m=2, when st=0, the partial string (i,0,2): "認証" (ninshou) of the text i matches the partial string (j,0,2): "認証" (ninshou) of the text j. In the same manner, when st=1, the partial string (i,1,2): "証シ" (shoshi)

of the text i matches the partial string (j,1,2): "証シ" (shoshi) of the text j. In the same manner, when st=2, the partial string (i,2,2): "シス" (shisu) of the text i matches the partial string (j,2,2): "シス" (shisu) of the text j. Here, the case where the start position of the partial string in which the text matches the text j is the same is described as an example, but the examination is performed in the same manner even if the start position differs.

When the partial string of the text i that has been referred to is the partial string of the text j, the common character string calculation unit 102 adds the partial string (i,st,m) that has undergone verification to the known set (Step A23).

The common character string calculation unit 102 then increments Nmatch (Step A24).

The common character string calculation unit 102 then compares Nmatch with Nmin (Step A25). When Nmatch is equal to or larger than Nmin (Nmatch≥Nmin), the procedure advances to Step A26, and when Nmatch is smaller than Nmin (Nmatch<Nmin), the procedure advances to Step A27. In the case of FIG. 6, when st=2, at a time point at which Nmatch=3 in progress of the processing, Nmatch becomes equal to or larger than Nmin, and hence the procedure advances to Step A26. Therefore, it is not verified whether or not there is a match with the partial string (i,3,2): "ステ" (sute) and the like of the text i and the subsequent texts. Note that, every st may be verified when it is acceptable to increase a processing amount.

The common character string calculation unit 102 stores j in the calculation object storage unit 101 as the calculation object, and finishes a similarity degree calculation between the text i and the text j (Step A26).

The common character string calculation unit 102 increments st for verification of the start position of the subsequent character string, and returns to Step A20 (Step A27).

By operating the document analysis system in the above-mentioned manner, the words are not split, and hence the similarity degree can be calculated without involving deterioration in precision due to word splitting errors being a problem of a morphological analysis. At the same time, by using information on whether or not there is a common part in the character string expressed in an original natural language in addition to a binary symbol string, it is possible to calculate the similarity degree while reducing the deterioration in precision during conversion into the binary symbol string. Therefore, according to this embodiment, it is possible to calculate the similarity degree with high accuracy. Further, the calculation using the common character string calculation unit can be performed with higher speed than the calculation using the similarity degree calculation unit, and hence, by narrowing down the calculation objects by using the common character string calculation unit, it is possible to calculate the similarity degree with high speed as a whole.

Second Embodiment

Next, a detailed description is made of a document analysis system according to a second embodiment of this invention with reference to the accompanying drawings. Note that, the same components as those of the first embodiment are denoted by the same reference numerals, and detailed descriptions thereof are omitted.

Figure 7:
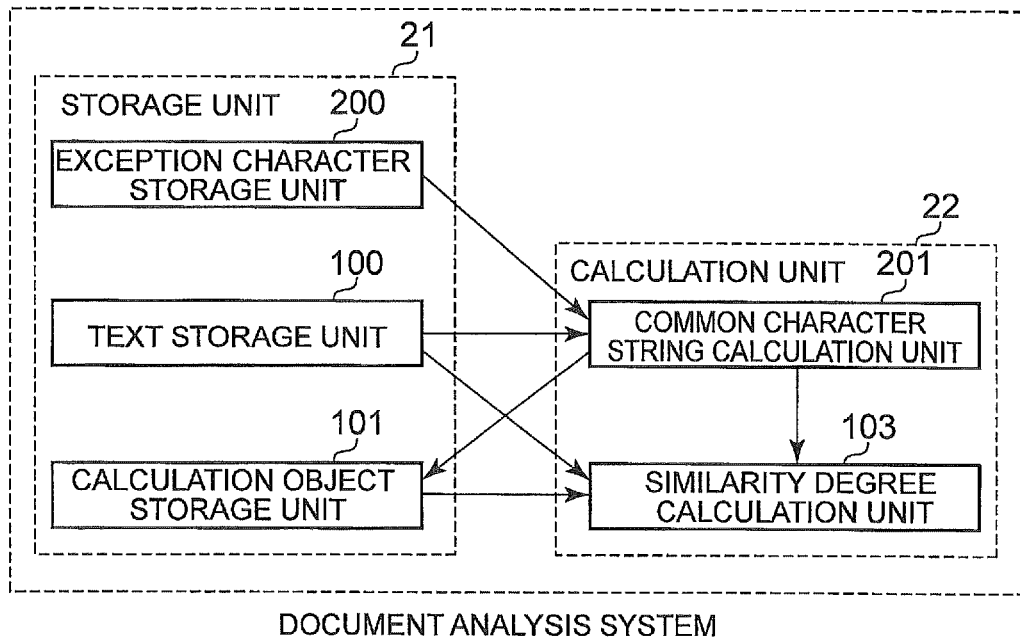
FIG. 7 is a block diagram illustrating a configuration example of a document analysis system according to a second embodiment.

Referring to FIG. 7, the document analysis system according to this embodiment mode includes a storage unit 21 for storing information and a calculation unit 22 operating under program control.

The storage unit 21 includes the text storage unit 100, an exception character storage unit 200, and the calculation object storage unit 101.

The text storage unit 100 is the same as that of the first embodiment.

The exception character storage unit 200 stores characters and character strings, which are not acknowledged (employed) as the common character strings, in a common character string calculation unit 201 described later as the exception character. The exception character represents frequently-occurring words, for example, hiragana and punctuations such as "、" (,) and "。" (.) in Japanese. Examples of the frequently-occurring word in English include "a", "the", "in", and punctuations such as "," and ".". The exception character may be designated by being input by the user of the system through the keyboard and the like, may be stored in the system as a default, or may be designated in another manner.

The calculation object storage unit 101 is the same as that of the first embodiment.

The calculation unit 22 includes the common character string calculation unit 201 and the similarity degree calculation unit 103.

The common character string calculation unit 201 excludes the exception characters stored in the exception character storage unit 200 from the texts stored in the text storage unit 100, then calculates the number of common character strings, and determines whether or not to effect the calculation object.

The similarity degree calculation unit 103 is the same as that of the first embodiment.

Figure 8:
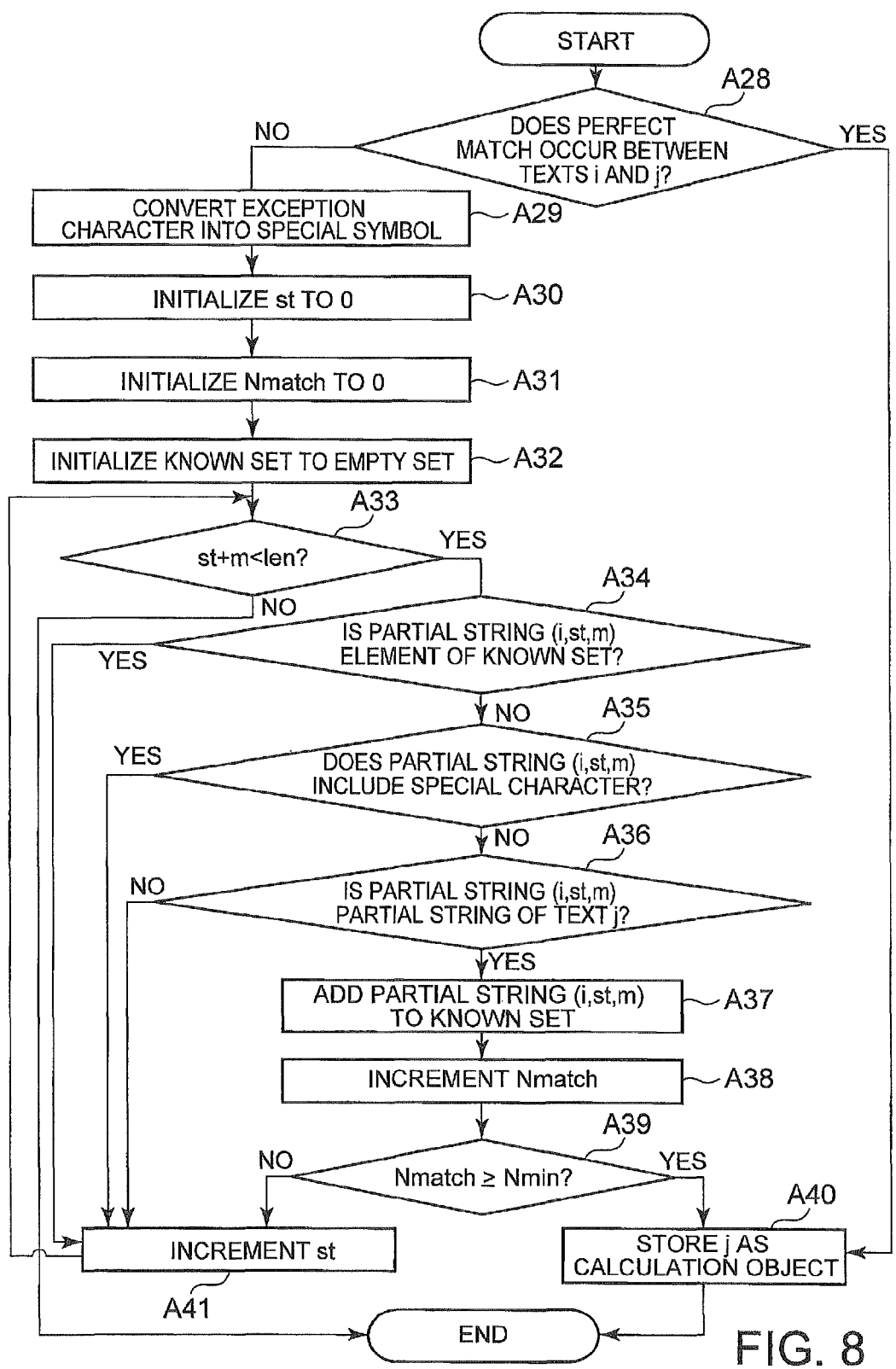
FIG. 8 is a flowchart illustrating an example of progress of processing for determining a number of common character strings excluding exception characters which is performed by the document analysis system according to the second embodiment.

Next, a detailed description is made of an operation of determination of the number of common character strings excluding the exception character according to the second embodiment with reference to a flowchart of FIG. 8.

The common character string calculation unit 201 first examines whether or not a perfect match occurs between the text i and the text j (Step A28). When the match occurs, the procedure advances to Step A40, and when the match does not occur, the procedure advances to Step A29.

The common character string calculation unit 201 then examines whether or not each of the exception characters stored in the exception character storage unit 200 is included in each of the texts, and when each of the exception characters is included, converts the character into the special symbol (Step A29). The special symbol represents such a special symbol as never to be included in all the texts, and may be designated by being input by the user of the system through the keyboard and the like, may be stored in the system as a default, or may be designated in another manner. Note that, the above-mentioned conversion may be performed so that special characters are assigned one by one to each of characters that form an exception character string or that one special character is assigned to an entirety of the characters that form the exception character string.

The common character string calculation unit 201 initializes a number st indicating a start position of the character string to 0 (Step A30).

The common character string calculation unit 201 then initializes a number Nmatch indicating the number of common characters string between the text i and the text j to 0 (Step A31).

The common character string calculation unit 201 then initializes a known set to an empty set having zero elements (Step A32).

The common character string calculation unit 102 then compares st+m with the number len of character strings of the text i (Step A33). When st+m is smaller than len (st+m<len), the procedure advances to Step A34. When st+m is equal to or larger than len (st+m≥len), the calculation of the number of common character strings between i and j is finished.

The common character string calculation unit 201 examines whether or not a partial string (i,st,m) is an element of the known set (Step A34). When the partial string (i,st,m) is the element, the procedure advances to Step A41. When the partial string (i,st,m) is not the element, the procedure advances to Step A36.

The common character string calculation unit 201 examines whether or not the partial string (i,st,m) includes the special character (Step A35). When the partial string (i,st,m) includes the special character, the procedure advances to Step A41. When the partial string (i,st,m) does not include the special character, the procedure advances to Step A36.

Figures 9, 10:
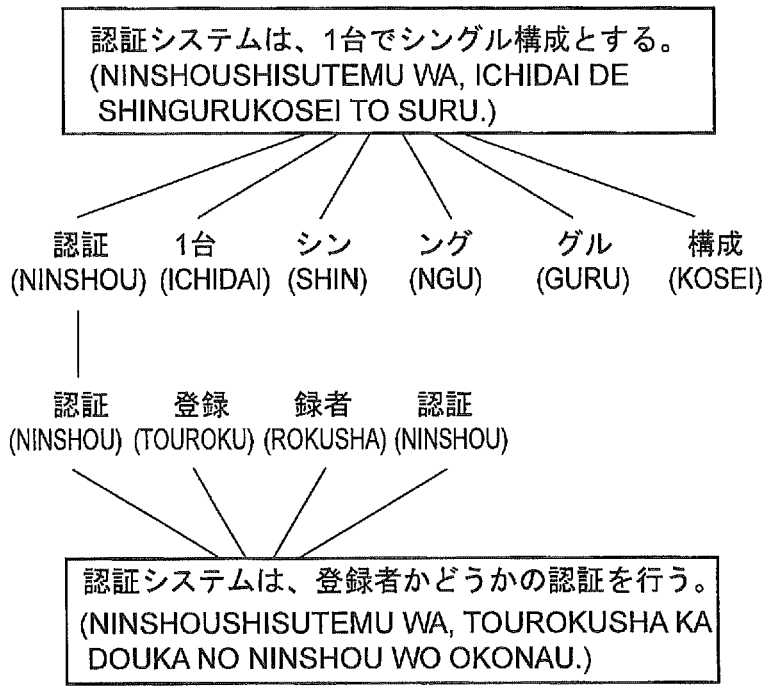
FIG. 9 is an explanatory diagram illustrating an example of a case where exception characters are excluded.
FIG. 10 is an explanatory diagram illustrating an example of a common character string calculation unit 201 in a case where the exception characters are used.

The common character string calculation unit 201 examines whether or not the partial string having m characters starting in the position st of the text i is included as the partial string of the text j (Step A36). When the partial string is included, the procedure advances to Step A37, and when the partial string is not included, the procedure advances to Step A41. FIG. 9 is an explanatory diagram illustrating an example of a case where the exception characters are excluded. The exception characters stated here represent hiragana, the punctuations, and the frequently-occurring word "システム" (shisutemu). Further, in the same manner as the above-mentioned example, it is assumed that m=2 and Nmin=3. When st=0, the partial string (i,0,2) of the text i is "認証" (ninshou), and the partial string (j,0,2)="認証" (ninshou) of the text j matches therewith, but the other parts do not match therewith, and hence the text 1 is not set as the calculation object with respect to the text 0. FIG. 10 is an explanatory diagram illustrating an example of the common character string calculation unit 201 in the case where the exception characters are used. As illustrated in FIG. 10, according to this embodiment, the exception characters are excluded to extract the common character string and perform the calculation, and hence a smaller number of texts than in the first embodiment (see FIG. 3) are set as the calculation objects.

The common character string calculation unit 201 adds the partial string (i,st,m) to the known set (Step A37).

The common character string calculation unit 201 then increments Nmatch (Step A38).

The common character string calculation unit 201 then compares Nmatch with Nmin (Step A39). When Nmatch is equal to or larger than Nmin (Nmatch≥Nmin), the procedure advances to Step A40, and when Nmatch is smaller than Nmin (Nmatch<Nmin), the procedure advances to Step A41.

The common character string calculation unit 201 stores j in the calculation object storage unit 101 as the calculation object, and finishes a similarity degree calculation between the text i and the text j (Step A40).

The common character string calculation unit 201 increments st for verification of the start position of the subsequent character string, and returns to Step A33 (Step A41).

Operations other than the above-mentioned ones according to this embodiment are the same as those of the first embodiment. Note that, here, the case where hiragana and the like are used as the exception characters is described as an example, but the morphological analysis may be performed to remove morphemes other than nouns, verbs, and adjectives that structure texts such as subjects and predicates.

According to this embodiment, the information on the common character string other than the exception characters are used, and hence it is possible to calculate the similarity degree with higher accuracy. In Japanese Patent No. 4238616 as a related art, the similarity degree is calculated after simply excluding "a", "the", "in", and the like. However, in the case of Japanese whose respective words cannot be segmented, when the exception characters such as hiragana are simply excluded, for example, a text "東でなく京都は西日本なので" (higashi de naku Kyoto wa nishi-Nippon nanode) becomes "東京都西日本" (higashi Kyoto nishi-Nippon), which may cause the similarity degree to a text relating to "東京都" (Tokyo-to) to become higher than required. Further, only by converting the exception characters into the special symbols, the similarity degree between the texts including a large number of exception characters becomes high. According to this embodiment, it is determined whether or not to effect the calculation object based on the common partial string that does not include the special symbol after converting the exception characters into the special symbols, which raises no such problem as described above. Further, when the similarity degree is calculated only by simply excluding an exception character part, which has a meaning as a sentence (role in sentence), meaning information on the exception character part cannot be used for the calculation of the similarity degree. According to this embodiment, the text including the original exception characters are used for the similarity degree calculation while the exception characters are used only to narrow down the calculation objects, and hence the meaning information on the exception character part is used as well, which enables the similarity degree to be calculated with high accuracy.

Third Embodiment

Next, a detailed description is made of a document analysis system according to a third embodiment of this invention with reference to the accompanying drawings. The document analysis system according to the third embodiment classifies (clusters, categorizes) texts into a plurality of groups. Note that, the same components as those of the second embodiment are denoted by the same reference numerals, and detailed descriptions thereof are omitted.

Figure 11:
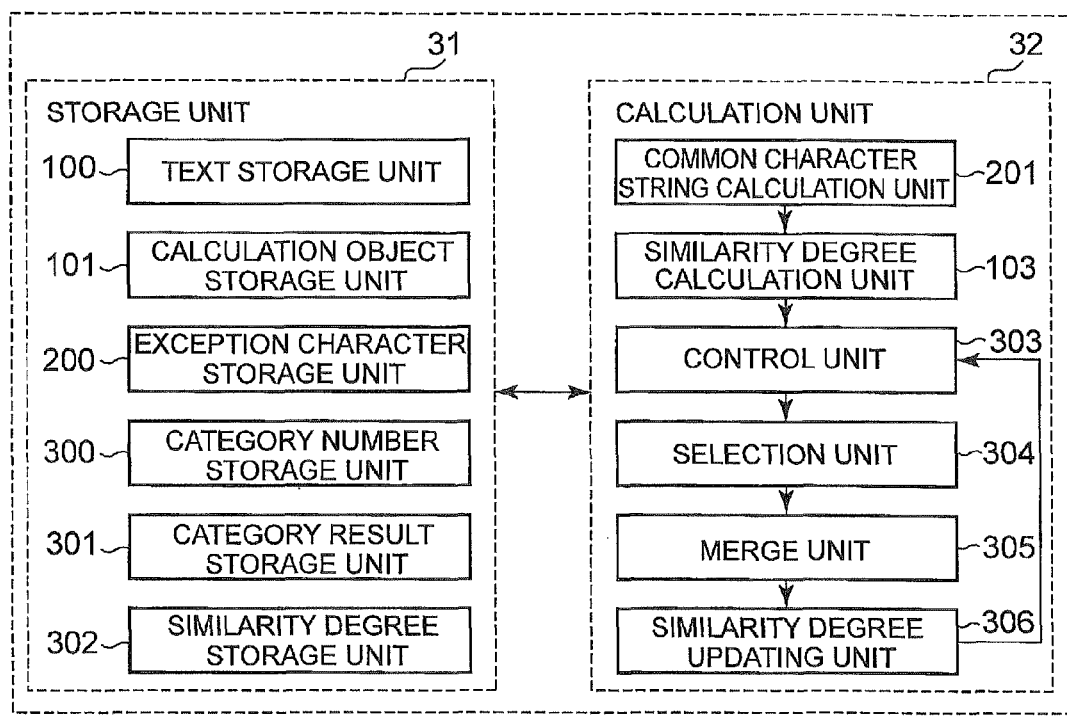
FIG. 11 is a block diagram illustrating a configuration example of a document analysis system according to a third embodiment.

Referring to FIG. 11, the document analysis system according to this embodiment includes a storage unit 31 for storing information and a calculation unit 32 operating under program control.

The storage unit 31 includes the text storage unit 100, the calculation object storage unit 101, the exception character storage unit 200, a category number storage unit 300, a category result storage unit 301, and a similarity degree storage unit 302.

The text storage unit 100 is the same as that of the second embodiment.

The calculation object storage unit 101 is the same as that of the second embodiment.

The exception character storage unit 200 is the same as that of the second embodiment.

The category number storage unit 300 stores a number of the categorization. FIG. 12 is an explanatory diagram illustrating an example of the category number storage unit 300. FIG. 12 illustrates an example of the category number storage unit 300 in an initial stage, in which a number of a category element for each of the respective IDs is the ID. FIG. 13 is an explanatory diagram illustrating another example of the category number storage unit 300. FIG. 13 illustrates an example of the category number storage unit 300 after the text 0 and a text 4 are categorized, in which the number 4 of the category element is added to a field having an ID of 0 while a row having an ID of 4 has been deleted.

The category result storage unit 301 stores the text obtained by concatenating texts classified into the same group in order. The category result storage unit 301 has the same contents as the text storage unit 100 in the initial stage. FIG. 14 is an explanatory diagram illustrating an example of the category result storage unit 301. FIG. 14 illustrates contents obtained by subjecting the text 0 and the text 4 to the categorization process with regard to the text examples recorded in the text storage unit 100 illustrated in FIG. 2. As the contents, the text having an ID of 0 is the text obtained by concatenating the text 0 with the text 4 while the row having an ID of 4 has been deleted.

The similarity degree storage unit 302 stores the similarity degree. FIG. 15 is an explanatory diagram illustrating an example of the similarity degree storage unit 302. The first row and the first column of FIG. 15 indicate the IDs. Further, an intersection part between the row having an ID of i and the column having an ID of j indicates the value of the similarity degree between the text i and the text j. As illustrated in FIG. 15, the diagonal components are the same texts, thereby indicating a similarity degree of 1, and the values of the similarity degrees in a matrix are symmetric with respect to the diagonal components. FIG. 16 is an explanatory diagram illustrating another example of the similarity degree storage unit 302. FIG. 16 illustrates an example of a case where the text 0 and the text 4 are categorized into the same group, and the row having an ID of 0 and the column having an ID of 0 are updated from the example illustrated in FIG. 15 while the row having an ID of 4 and the column having an ID of 4 are deleted.

The calculation unit 32 includes the common character string calculation unit 201, the similarity degree calculation unit 103, a control unit 303, a selection unit 304, a merge unit 305, and a similarity degree updating unit 306.

The common character string calculation unit 201 is the same as that of the second embodiment.

The similarity degree calculation unit 103 is the same as that of the second embodiment.

The control unit 303 performs control so that the classification processing is continued until a predetermined termination condition is satisfied. The termination condition may be designated by being input by the user of the system through the keyboard and the like, may be stored in the system as a default, or may be designated in another manner. For example, the classification processing is finished when a maximum value of the similarity degrees between the clusters becomes smaller than a predetermined value. Alternatively, for example, the classification processing is finished when a number of clusters becomes equal to or smaller than a predetermined value.

The selection unit 304 selects two texts based on the similarity degree stored in the similarity degree storage unit 302.

The merge unit 305 merges the two selected texts, and stores the texts in the category number storage unit 300 and the category result storage unit 301.

The similarity degree updating unit 306 updates the similarity degree based on the calculation object stored in the calculation object storage unit 101 and a category result stored in the category result storage unit 301, and stores the similarity degree in the similarity degree storage unit 302.

Figure 17:
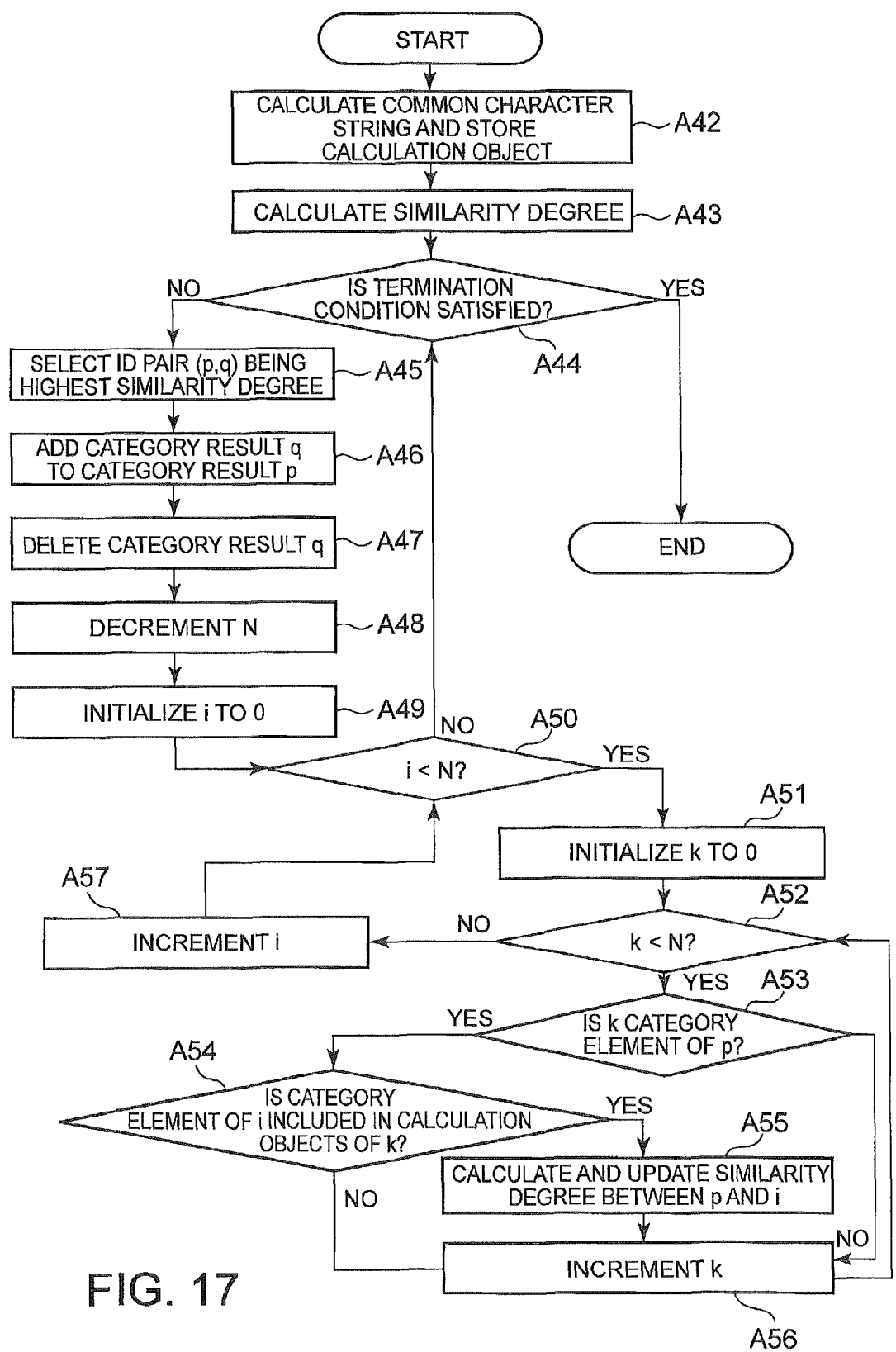
FIG. 17 is a flowchart illustrating an example of progress of processing performs by the document analysis system according to the third embodiment.

Next, a detailed description is made of an overall operation according to the third embodiment with reference to a flowchart of FIG. 17.

In the same manner as the above-mentioned embodiments, the common character string calculation unit 201 calculates the common character string by excluding the exception characters stored in the exception character storage unit 200 from the text stored in the text storage unit 100, and stores the calculation object in the calculation object storage unit 101 (Step A42). Note that, as in the first embodiment, the configuration does not need to involve the use of the exception character storage unit 200.

In the same manner as the above-mentioned embodiments, the similarity degree calculation unit 103 may calculate the similarity degree based on the calculation object stored in the calculation object storage unit 101 and the text stored in the text storage unit 100, and stores the calculated similarity degree in the similarity degree storage unit 302 (Step A43).

The control unit 303 examines whether or not the termination condition for the classification processing is satisfied (Step A44). When the termination condition is satisfied, the processing is brought to an end, and when the termination condition is not satisfied, the procedure advances to the subsequent step.

The selection unit 304 then selects an ID pair (p,q) being the highest similarity degree among the similarity degrees stored in the similarity degree storage unit 302 (Step A45).

The merge unit 305 first adds q to the category element of a category number p of the category number storage unit 300 with regard to the ID pair (p,q) selected by the selection unit 304, and adds a category result q to a category result p of the category result storage unit 301 (Step A46).

The merge unit 305 then deletes the row of a category number q from the category number storage unit 300, and also deletes the row of the category result q from the category result storage unit 301 (Step A47).

The merge unit 305 then decrements the number N of texts (Step A48).

The similarity degree updating unit 306 first initializes i being the number indicating the ID of the text to 0 (Step A49).

The similarity degree updating unit 306 then compares i with the number N of texts (Step A50). When i is smaller than N (i<N), the procedure advances to the subsequent step, and when i is equal to or larger than N (i≥N), the procedure returns to Step A44.

The similarity degree updating unit 306 then initializes k being another number indicating the ID of the text to 0 (Step A51).

The similarity degree updating unit 306 then compares k with the number N of texts (Step A52). When k is smaller than N (k<N), the procedure advances to the subsequent step, and when k is equal to or larger than N (k≥N), the procedure advances to Step A57.

The similarity degree updating unit 306 then refers to the category number storage unit 300 to examine whether or not k is the category element of p (Step A53). When k is the category element, the procedure advances to the subsequent step, and when k is not the category element, the procedure advances to Step A56.

The similarity degree updating unit 306 then refers to the calculation object storage unit 101 and the category number storage unit 300 to examine whether or not the category element of i is included in the calculation objects of k (Step A54). When the category element of i is included, the procedure advances to the subsequent step, and when the category element of i is not included, the procedure advances to Step A56.

The similarity degree updating unit 306 then calculates the similarity degree between p and i, and updates the similarity degree between p and i in the similarity degree storage unit 302 (Step A55).

The similarity degree updating unit 306 then increments k, and returns to Step A52 (Step A56).

The similarity degree updating unit 306 verifies the IDs of all the texts with respect to i, then increments i, and returns to Step A50 (Step A57).

According to this embodiment, both the individual information on the texts included in the clusters and the information on the whole clusters are used, and hence it is possible to perform the categorization and search of the texts with high accuracy. In this case, if the number of common partial strings between the texts concatenated as the clusters is calculated simply by using the information on the whole clusters, the cluster in which a large number of texts are concatenated has a longer character string length and is likely to have more common character strings extracted with a higher probability of occurrence of the calculation objects than the otherwise-structured cluster. Therefore, chaining in which elements are absorbed into one given cluster in order one by one to generate a huge cluster is likely to occur. When the chaining occurs, no matter which number is designated as the number of clusters, the elements are classified into one huge cluster and other clusters that are each formed of one element, which fails to correctly classify the elements. The document analysis system according to this embodiment is configured to use the common partial strings between the texts included in the clusters instead of the common partial strings between the texts concatenated as the clusters, and hence it is possible to categorize the texts with high accuracy with a lower probability of occurrence of the chaining.

This invention is described above with reference to the embodiment mode and the plurality of embodiments, but this invention is not limited to the above-mentioned embodiment mode and embodiments. The configurations and details of this invention can be subjected to various changes that can be understood by those skilled in the art within the spirit and the scope of this invention disclosed in the claims.

Note that, the respective components of the document analysis system may be realized by using a combination of hardware and software. In the mode that combines hardware and software, a program for text analysis is developed in a RAM, and the hardware such as a CPU is caused to operate based on the program, to thereby cause the respective components to operate. Further, the above-mentioned program may be distributed in a state of being recorded in a storage medium. The program recorded in the recording medium is read into the memory by wire, wirelessly, or through the recording medium itself, and causes a control unit and the like to operate. Note that, examples of the recording medium include an optical disc, a magnetic disk, a semiconductor memory device, and a hard disk drive.

Further, a part or all of the above-mentioned embodiment mode can be described as follows. Note that, this invention is not limited by the following notes in any way.

[Note 1]

A document analysis system, including:
  a common character string calculation unit to extract character strings that are common between two texts and to determine whether or not the two texts are to be set as calculation objects based on a number of the extracted character strings that are common; and
  a similarity degree calculation unit to calculate, when the two texts are the calculation objects determined by the common character string calculation unit, a similarity degree therebetween by using an approximation of a Kolmogorov complexity, and when the two texts are not the calculation objects, setting the similarity degree between the two texts to zero.

[Note 2]

A document analysis system as described in the above-mentioned Note, in which the common character string calculation unit determines the two texts as the calculation objects when a predetermined number of common character strings or more having a predetermined character string length exist in the two texts, and otherwise determines that the two texts are not to be set as the calculation objects.

[Note 3]

A document analysis system as described in the above-mentioned Note, in which the common character string calculation unit extracts only the common character string that does not include a predetermined exception character.

[Note 4]

A document analysis system as described in the above-mentioned Notes, in which the common character string calculation unit converts a predetermined exception character into a special character, then scans the two texts in order, and extracts only the common character string that does not include the special character.

[Note 5]

A document analysis system as described in the above-mentioned Notes,
  provided that, with regard to a plurality of texts, respective sets each including one text are set as respective clusters,
  in which the similarity degree calculation unit includes:
    a control unit to calculate the similarity degree between the texts included in the clusters as the similarity degree between the clusters and performing control so that subsequent processing is repeated until a predetermined termination condition is satisfied;
    a selection unit to select two clusters based on the similarity degree between the clusters;
    a merge unit to merge the selected two clusters; and
    a similarity degree updating unit to determine, with regard to the two clusters, whether or not the two clusters are to be set as the calculation objects based on the common character strings between the respective texts included in the clusters, and when the two clusters are to be set as the calculation object, calculating the similarity degree between the text obtained by arranging the texts included in one cluster in order and the text obtained by arranging the texts included in another cluster in order by using the approximation of the Kolmogorov complexity and setting the similarity degree between the texts as the similarity degree between the two clusters, and when the two clusters are not to be set as the calculation object, setting the similarity degree between the two clusters to zero.

[Note 6]

A document analysis method, including:
  a common character string calculation step of extracting character strings that are common between two texts and determining whether or not the two texts are to be set as calculation objects based on a number of the extracted character strings that are common; and a similarity degree calculation step of calculating, when the two texts are the calculation objects determined in the common character string calculation step, a similarity degree therebetween by using an approximation of a Kolmogorov complexity, and when the two texts are not the calculation objects, setting the similarity degree between the two texts to zero.

[Note 7]

A document analysis method as described in the above-mentioned Note, in which the common character string calculation step includes determining the two texts as the calculation objects when a predetermined number of common character strings or more having a predetermined character string length exist in the two texts, and otherwise determining that the two texts are not to be set as the calculation objects.

[Note 8]

A document analysis method as described in the above-mentioned Note, in which the common character string calculation step includes extracting only the common character string that does not include a predetermined exception character.

[Note 9]

A document analysis method as described in the above-mentioned Notes, in which the common character string calculation step includes converting a predetermined exception character into a special character, then scanning the two texts in order, and extracting only the common character string that does not include the special character.

[Note 10]

A document analysis method as described in the above-mentioned Notes, further including:

with regard to a plurality of texts, a step of setting respective sets each including one text as respective clusters;

a step of calculating the similarity degree between the texts included in the clusters as the similarity degree between the clusters and performing control so that subsequent processing is repeated until a predetermined termination condition is satisfied;

a step of selecting two clusters based on the similarity degree between the clusters;

a step of merging the selected two clusters; and a step of determining, with regard to the two clusters, whether or not the two clusters are to be set as the calculation objects based on the common character strings between the respective texts included in the clusters, and when the two clusters are to be set as the calculation object, calculating the similarity degree between the text obtained by arranging the texts included in one cluster in order and the text obtained by arranging the texts included in another cluster in order by using the approximation of the Kolmogorov complexity and setting the similarity degree between the texts as the similarity degree between the two clusters, and when the two clusters are not to be set as the calculation object, setting the similarity degree between the two clusters to zero.

[Note 11]

A document analysis program for causing a computer to execute:

common character string calculation processing to extract character strings that are common between two texts and to determine whether or not the two texts are to be set as calculation objects based on a number of the extracted character strings that are common; and similarity degree calculation processing to calculate, when the two texts are the calculation objects determined by the common character string calculation processing, a similarity degree therebetween by using an approximation of a Kolmogorov complexity, and when the two texts are not the calculation objects, setting the similarity degree between the two texts to zero.

[Note 12]

A document analysis program as described in the above-mentioned Note, in which the common character string calculation processing causes the computer to determine the two texts as the calculation objects when a predetermined number of common character strings or more having a predetermined character string length exist in the two texts, and otherwise determine that the two texts are not to be set as the calculation objects.

[Note 13]

A document analysis program as described in the above-mentioned Note, in which the common character string calculation processing causes the computer to extract only the common character string that does not include a predetermined exception character.

[Note 14]

A document analysis program as described in the above-mentioned Notes, in which the common character string calculation processing causes the computer to convert a predetermined exception character into a special character, then scan the two texts in order, and extract only the common character string that does not include the special character.

[Note 15]

A document analysis program as described in the above-mentioned Notes, provided that, with regard to a plurality of texts, the document analysis program further causes the computer to execute classification processing for setting respective sets each including one text as respective clusters, in which the similarity degree calculation processing causes the computer to execute:

processing for calculating the similarity degree between the texts included in the clusters as the similarity degree between the clusters and performing control so that subsequent processing is repeated until a predetermined termination condition is satisfied;

processing for selecting two clusters based on the similarity degree between the clusters;

processing for merging the selected two clusters; and processing for determining, with regard to the two clusters, whether or not the two clusters are to be set as the calculation objects based on the common character strings between the respective texts included in the clusters, and when the two clusters are to be set as the calculation object, calculating the similarity degree between the text obtained by arranging the texts included in one cluster in order and the text obtained by arranging the texts included in another cluster in order by using the approximation of the Kolmogorov complexity and setting the similarity degree between the texts as the similarity degree between the two clusters, and when the two clusters are not to be set as the calculation object, setting the similarity degree between the two clusters to zero.

This application claims priority from Japanese Patent Application No. 2010-186866, filed on Aug. 24, 2010, the entire disclosure of which is incorporated herein by reference.

REFERENCE SIGNS LIST

11 storage unit
12 calculation unit 21 storage unit
22 calculation unit
31 storage unit
32 calculation unit
100 text storage unit
101 calculation object storage unit
102 common character string calculation unit
103 similarity degree calculation unit
200 exception character storage unit
201 common character string calculation unit
300 category number storage unit
301 category result storage unit
302 similarity degree storage unit
303 control unit
304 selection unit
305 merge unit
306 similarity degree updating unit

The invention claimed is:

1. A similarity degree calculation method for use in calculating a similarity degree between a plurality of texts by a computer system including a process, a storage unit an input device and an output device, the method comprising:
storing the plurality of texts via the input device into the storage unit;
extracting, by the processor, each common character string that has a predetermined character string length and that is sent from the plurality of texts to the storage unit;
determining, by the processor, whether or not two texts of the plurality of texts are to be set a Kolmogorov complexity calculation objects based on a number of the extracted each common character strings and a predetermined number of common character strings, as a result of pretreatments of each similarity degree calculation of the plurality of texts by using the Kolmogorov complexity, wherein a pretreatment of the pretreatments refers to the number of extracted common character strings in an original language and determines whether a processing of the Kolmogorov complexity to the similarity degree calculation is to be performed, before performing a calculation processing of the Kolmogorov complexity between the two texts;
by the processor, each similarity degree of the plurality of texts, when the two texts are the Kolmogorov complexity calculation objects, calculating the similarity degree of a Kolmogorov complexity, and when the two texts are not the Kolmogorov complexity calculation objects, handing the similarity degree between the stored two texts in the storage unit as being dissimilar; and
outputting, by the processor and the output device, the each similarity degree between the stored two texts in the storage unit.

2. A non-transitory computer-readable recording medium having recorded thereon a document analysis program for causing a computer including a processor, a storage unit, an input device, and an output device, the processor operates by the document analysis program as:
to receive a plurality of texts from the storage unit;
to extract each common character string having a predetermined character string length from the plurality of texts in the storage unit;
to determine whether or not a a two texts of the plurality of texts are to be set as Kolmogorov complexity calculation objects, based on a number of the extracted each common character strings and a predetermined number of common character strings, as a result of pretreatments of each similarity degree calculation of the plurality of texts by using the Kolmogorov complexity, wherein a pretreatment of the pretreatments refers to the number of extracted common character strings in an original language and determines whether a processing of the Kolmogorov complexity to the similarity degree calculation is to be performed, before performing a calculation processing of the Kolmogorov complexity between the two texts;
to calculate each similarity degree of the plurality of texts, when the two texts are the Kolmogorov complexity calculation objects, calculating the similarity degree of a Kolmogorov complexity, and when the two texts are not the Kolmogorov complexity calculation objects, handling the similarity degree between the stored two texts in the storage unit as being dissimilar; and
to output the each similarity degree of the plurality of texts to at least one of the output device and the storage unit.

3. The non-transitory computer-readable recording medium according to claim 2, wherein the processor operates by the document analysis program as to output said each similarity degree of the plurality of texts to the output device and the storage unit.

4. A document analysis system, comprising an information processing apparatus including a processor, a storage unit, an input device, and an output device:
wherein the storage unit stores two texts which are derived from documents and which are given from the input device;
wherein the processor comprises:
a common character string extractor configured to extract each of common character strings that is common between the two texts and that has a predetermined character string length, and to determine whether or not the two texts are to be set as Kolmogorov complexity calculation objects, based on both a number of the extracted common character strings and a predetermined number of common character strings, as a result of pretreatments of each similarity degree calculation of predetermine using the Kolmogorov complexity, wherein a pretreatment of the pretreatments refers to the number of extracted common character strings in an original language and determines whether a processing of the Kolmogorov complexity to the similarity degree calculation is to be performed, before performing a calculation processing of the Kolmogorov complexity between the two texts;
a similarity degree calculation unit configured to calculate each similarity degree between the stored two texts in the storage unit, to calculate, when the two texts include the Kolmogorov complexity calculation objects determined by the common character string extractor, a similarity degree therebetween by using an approximation of a Kolmogorov complexity, and to handle, when the two texts are not the Kolmogorov complexity calculation objects, the similarity degree between the two texts as being dissimilar, and
wherein each similarity degree of the stored two texts in the storage unit is supplied to at least one of the output device and the storage unit from the processor.

5. The document analysis system according to claim 4, wherein the processor extracts only the common character string that does not include a predetermined exception character.

6. The document analysis system according to claim 5, wherein the processor converts a predetermined exception character into a special character, then scans the two texts in order, and extracts only the common character string that does not include the special character.

7. The document analysis system according to claim 5, wherein, assuming that, with regard to the plurality of texts, respective sets each including one or more text are set as a respective cluster,
the processor performing control for clustering so that subsequent processing is repeated until a predetermined termination condition is satisfied:
to calculate each similarity degree between the clusters based each similarity degree between the each texts included in the each clusters;
to select two clusters based on the similarity degree between the clusters;
to merge the selected two clusters and included two texts of the selected two clusters; and
to determine, with regard to the two clusters, whether or not the two clusters are to be set as the Kolmogorov complexity calculation objects based on the common character strings between the respective texts included in the clusters,
wherein, when the two clusters include the Kolmogorov complexity calculation objects, the processor calculates the similarity degree of Kolmogorov complexity between the two clusters, based first merged text included in one cluster in order and second merged text included in another cluster in order,
wherein, when the two clusters are not to be set as the Kolmogorov complexity calculation objects, the processor sets the similarity degree between the two clusters to zero, and
wherein the processor outputs the each similarity degree of final clusters to at least one of the output device and the storage unit.

8. The document analysis system according to claim 7, wherein the processor outputs said each similarity degree of final clusters to the output device and the storage unit.

9. The document analysis system according to claim 4, wherein the processor converts a predetermined exception character into a special character, then scans the two texts in order, and extracts only the common character string that does not include the special character.

10. The document analysis system according to claim 9, wherein, assuming that, with regard to the plurality of texts, respective sets each including one or more text are set as a respective cluster, the processor is configured to perform control for clustering so that subsequent processing is repeated until a predetermined termination condition is satisfied:
to calculate each similarity degree between the clusters based each similarity degree between the each text included in the each cluster;
to select two clusters based on the similarity degree between the clusters;
to merge the selected two clusters including two texts of the selected two clusters; and
to determine, with regard to the two clusters, whether or not the two clusters are to be set as the Kolmogorov complexity calculation objects based on the common character strings between the respective texts included in the clusters,
wherein, when the two clusters are the Kolmogorov complexity calculation objects, the processor calculates the similarity degree of Kolmogorov complexity between the two clusters, based first merged text included in one cluster in order and second merged text included in another cluster in order,
wherein, when the two clusters are not to be set as the similarity Kolmogorov complexity calculation objects, the processor sets the similarity degree between the two clusters to zero, and
wherein the processor outputs the each similarity degree of final clusters to at least one of the output device and the storage unit.

11. The document analysis system according to claim 10, wherein the processor outputs said each similarity degree of final clusters to the output device and the storage unit.

12. The document analysis system according to claim 4, wherein, assuming that, with regard to the plurality of the texts, respective sets each including one or more text are set as a respective cluster, the processor:
performs control for clustering such that subsequent processing is repeated until a predetermined termination condition is satisfied;
calculates each similarity degree between the clusters based each similarity degree between the each texts included in the each clusters;
selects two clusters based on the similarity degree between the clusters;
merges the selected two clusters included two texts of the selected two clusters; and
determines, with regard to the two clusters, whether or not the two clusters are to be set as the Kolmogorov complexity calculation objects based on the common character strings between the respective texts included in the clusters,
wherein, when the two clusters are the Kolmogorov complexity calculation objects, the processor calculates the similarity degree of Kolmogorov complexity between the two clusters, based on first merged text included in one cluster in order and second merged text included in another cluster in order,
wherein, when the two clusters are not to be set as the Kolmogorov complexity calculation objects, the processor sets the similarity degree between the two clusters to zero, and
wherein the processor outputs the each similarity degree of final clusters to at least one of the output device and the storage unit.

13. The document analysis system according to claim 12, wherein the processor outputs said each similarity degree of final clusters to the output device and the storage unit.

14. The document analysis system according to claim 4, wherein said each similarity degree of the two texts is supplied to the output device and the storage unit from the processor.

15. The document analysis system according to claim 4, wherein the document analysis system is configured to determine whether a similarity degree calculation of the Kolmogorov complexity is used by the processor.

16. The document analysis system according to claim 4, wherein the document analysis system is configured to determine whether a similarity degree calculation of the Kolmogorov complexity is used by the processor, in response to a request of a similarity degree calculation of character strings in each text by the information processing apparatus.

17. The document analysis system according to claim 4, wherein the document analysis system is configured to determine whether a processing of the Kolmogorov complexity to the similarity degree calculation is to be performed, before performing a calculation processing of the Kolmogorov complexity between the two texts.

18. The document analysis system according to claim 4, wherein extraction of said each of common character strings is carried out as a pretreatment of the similarity degree determination.

\* \* \* \* \*